United States Patent
Kutila et al.

(10) Patent No.: US 10,730,512 B2
(45) Date of Patent: Aug. 4, 2020

(54) METHOD AND SYSTEM FOR COLLABORATIVE SENSING FOR UPDATING DYNAMIC MAP LAYERS

(71) Applicant: PCMS Holdings, Inc., Wilmington, DE (US)

(72) Inventors: Matti Kutila, Tampere (FI); Mikko Tarkiainen, Tampere (FI); Pertti Peussa, Tampere (FI); Ari Virtanen, Lampäälä (FI)

(73) Assignee: PCMS HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/095,924

(22) PCT Filed: Apr. 27, 2017

(86) PCT No.: PCT/US2017/029886
§ 371 (c)(1),
(2) Date: Oct. 23, 2018

(87) PCT Pub. No.: WO2017/192358
PCT Pub. Date: Nov. 9, 2017

(65) Prior Publication Data
US 2019/0143967 A1   May 16, 2019

Related U.S. Application Data

(60) Provisional application No. 62/332,865, filed on May 6, 2016.

(51) Int. Cl.
*B60W 30/09* (2012.01)
*G08G 1/16* (2006.01)
(Continued)

(52) U.S. Cl.
CPC ............ *B60W 30/09* (2013.01); *B60Q 9/008* (2013.01); *B60W 30/18163* (2013.01);
(Continued)

(58) Field of Classification Search
CPC .......... B60W 30/09; B60W 30/18163; B60W 50/14; B60Q 9/008; G05D 1/0214;
(Continued)

(56) References Cited

U.S. PATENT DOCUMENTS 5,614,895 A    3/1997  Ohomori
6,230,098 B1   5/2001  Ando
(Continued)

FOREIGN PATENT DOCUMENTS

EP    2915718 A1    9/2015
WO    2015009221    1/2015

OTHER PUBLICATIONS

Connected Vehicle Reference Implementation Architecture. Situation awareness: Available at: http://www.iteris.com/cvria/html/applications/app62.html#tab-3. Last updated May 5, 2016.
(Continued)

*Primary Examiner* — Anne Marie Antonucci
*Assistant Examiner* — Andrew J Cromer
(74) *Attorney, Agent, or Firm* — Invention Mine LLC (57) ABSTRACT

Systems and methods related to dynamic map layers for autonomous or semi-autonomous vehicles and allowing real-time (e.g. latency of less than one second) updates utilizing a plurality of available surrounding sensors (e.g., collaborative sensors), including roadside sensors and sensors of other nearby vehicles. When a vehicle detects an obstruction to a field of view of a sensor, the vehicle may request sensor data from other vehicles to fill the gap in
(Continued)

sensor data of the vehicle. This allows the vehicle driver or vehicle illumination system to be focused on the obstructed area.

20 Claims, 7 Drawing Sheets

(51) Int. Cl.
| | |
|---|---|
| B60Q 9/00 | (2006.01) |
| B60W 30/18 | (2012.01) |
| B60W 50/14 | (2020.01) |
| G05D 1/02 | (2020.01) |
| G01S 13/931 | (2020.01) |

(52) U.S. Cl.
CPC ........... *B60W 50/14* (2013.01); *G05D 1/0214* (2013.01); *G05D 1/0231* (2013.01); *G05D 1/0257* (2013.01); *G08G 1/162* (2013.01); *G08G 1/165* (2013.01); *G08G 1/166* (2013.01); *B60W 2050/146* (2013.01); *B60W 2400/00* (2013.01); *B60W 2540/30* (2013.01); *B60W 2554/00* (2020.02); *G01S 2013/9316* (2020.01); *G05D 2201/0213* (2013.01)

(58) Field of Classification Search
CPC .... G05D 1/0231; G05D 1/0257; G08G 1/162; G08G 1/165; G08G 1/166
See application file for complete search history.

(56) References Cited

U.S. PATENT DOCUMENTS

| | | | |
|---|---|---|---|
| 8,467,928 B2 | 6/2013 | Anderson | |
| 8,594,923 B2 | 11/2013 | Wong | |
| 2001/0039469 A1* | 11/2001 | Nishimura | B60Q 1/085 701/49 |
| 2002/0198660 A1* | 12/2002 | Lutter | G08G 1/0965 701/301 |
| 2007/0030212 A1 | 2/2007 | Shibata | |
| 2011/0169625 A1 | 7/2011 | James | |
| 2012/0095641 A1* | 4/2012 | Merk | G08G 1/161 701/28 |
| 2013/0113910 A1* | 5/2013 | Kim | B60K 28/066 348/77 |
| 2014/0341434 A1 | 11/2014 | Lin | |
| 2015/0193988 A1 | 7/2015 | Jenkins | |
| 2015/0339534 A1 | 11/2015 | Morikawa | |

OTHER PUBLICATIONS

Coxworth, B., "See-Through System turns view-blocking vehicles transparent", New Atlas, Oct. 17, 2013.
ETSI, "Intelligent Transport Systems (ITS); Vehicular Communications; Basic Set of Applications; Local Dynamic Maps (LDM)". ETSI EN 302 895 v1.1.1. standard, Sep. 2014.
ETSI, Intelligent Transport Systems (ITS); Vehicular communications; Basic Set of Applications; Part 2: Specification of Cooperative Awareness Basic Service. ETSI standard EN 302 637-2. v1.3.1, Sep. 2014.
ETSI, Intelligent Transport Systems (ITS); Vehicular Communications; Basic Set of Applications; Part 3: Specifications of Decentralized Environmental Notification Basic Service. ETSI standard EN 302 637-3 v1.2.1, Sep. 2014.
Gomes, P., et. al., "The See-Through System: From implementation to test-drive," 2012 IEEE Vehicular Networking Conference (VNC), (2012), 9 pages. DOI: 10.1109/VNC.2012.6407443.
Here, "Vehicle Sensor Data Cloud Ingestion Interface Specification", V2.0.2 (2015), 72 pages.
International Preliminary Report on Patentability for PCT/US2017/029886 dated Jul. 20, 2018.
Notification of Transmittal of the International Search Report and the Written Opinion of the International Searching Authority, or the Declaration for PCT/US2017/029886 dated Sep. 19, 2017, 13 pages.
Samsung Newsroom, "The Safety Truck Could Revolutionize Road Safety", Jun. 18, 2015, 3 pages.
Written Opinion of the International Preliminary Examining Authority for PCT/US2017/029886 dated Apr. 16, 2018.
Gomes, P., et. al., "Making Vehicles Transparent Through V2V Video Streaming", IEEE Transactions on Intelligent Transportation systems, Jun. 2012, 21 pages.
Abdi, L., et. al., "Driver information system: a combination of augmented reality, deep learning and vehicular Ad-hoc networks". Springer, Multimedia Tools and Applications, vol. 67, No. 3, published online on Aug. 3, 2017, 33 pages.
Abdi, L., et. al., "In-vehicle augmented reality TSR to improve driving safety and enhance the driver's experience". Springer-Verlag London Ltd. published online on Jun. 13, 2017, 8 pages.
Abdi, L., et. al, "In-vehicle augmented reality system to provide driving safety information". The Visualization Society of Japan published online on Aug. 10, 2017, 22 pages.
Silvéria, MK., "Virtual Windshields: Merging Reality and Digital Content to Improve the Driving Experience". Faculdade de Engenharia da Universidade do Porto, Jul. 2013, 115 pages.
Monreal, C., et. al., "The See-Through Systems: A VANET-enabled assistant for overtaking maneuvers". IEEE Xplore, Jul. 2010, 7 pages.
Ferreira, M., et. al., "Augmented Reality Driving Supported by Vehicular Ad Hoc Networking", Oct. 2013, 3 pages.
Gomes, P., et. al., "See-Through System: an overtaking assistance system", (from YouTube) published on Jan. 25, 2013, 85 pages. Available at: https://www.youtube.com/watch?time_continue=4&v=Esh1EjgBQal.
Samsung Argentina, "Samsung Safety Truck" English version, (from YouTube), published on Jun. 17, 2015, last visited on Oct. 23, 2018, 120 pages. Available at: https://www.youtube.com/watch?time 'continue=120&v=6GNGfse9ZK8.
Elektrobit, "Map updates for autonomous driving—the sensor cloud approach". Slides of the Automotive World Webinar, Dec. 15, 2015, 36 pages.
ETSI, "Intelligent Transport Systems (ITS); Vehicular Communications; Basic Set of Applications; Local Dynamic Map (LDM); Rationale for and guidance on standardization". ETSI Technical Report 102 863 V1.1.1 (2006), 40 pages.
Sae, "Taxonomy and Definitions for Terms Related to On-Road Motor Vehicle Automated Driving Systems". Standard J3016, issued Jan. 16, 2014 (Jan. 16, 2014). Society of Automotive Engineers, 12 pages.
Curn, J., et. al., "A Flexible Approach to Management and Processing of Collaborative Vehicular Perception Data". Proceedings of the Workshop on Emergent Cooperative Technologies in Intelligent Transportation Systems, 2010 IEEE Intelligent Transportation, Sep. 2010, 6 pages.
O'Hara, N., et. al., "MDDSVsim: An Integrated Traffic Simulation Platform for Autonomous Vehicle Research". The International Workshop on Vehicular Traffic Management for Smart Cities (VTM 2012), Nov. 2012, 6 pages.

\* cited by examiner

METHOD AND SYSTEM FOR COLLABORATIVE SENSING FOR UPDATING DYNAMIC MAP LAYERS

CROSS-REFERENCE TO RELATED APPLICATIONS

The present application is a national stage application under 35 U.S.C. 371 of International Application No. PCT/US2017/029886, entitled METHOD AND SYSTEM FOR COLLABORATIVE SENSING FOR UPDATING DYNAMIC MAP LAYERS, filed on Apr. 27, 2017, which claims benefit under 35 U.S.C. § 119(e) from, U.S. Provisional Patent Application Ser. No. 62/332,865, filed May 6, 2016, entitled "METHOD AND SYSTEM FOR COLLABORATIVE SENSING FOR UPDATING DYNAMIC MAP LAYERS", which is incorporated herein by reference in its entirety.

TECHNICAL FIELD

The present disclosure generally relates to automotive vehicles, and more specifically to automotive perception sensors.

BACKGROUND

Global maps need to be updated in almost real-time and be reliable, especially when such maps directly influence vehicle controls (e.g., emergency braking). In certain places, such as outside urban centers, the accuracy of maps may tend to be lower and have rarer updates performed by map providers. Municipalities are typically in charge of dynamic map updates (e.g., road works), and the channels to offer the latest vehicle navigation systems are not always clear. Often, the locations of road edges change over time, especially considering gravel roads and snow piles on the edges of roads, or the like. However, current and accurate information regarding the position of road edges is important for use by autonomous vehicle computing systems, for example to allow accurate calculation of when a pedestrian or bicycle (or the like) is on a collision path that requires a reaction by the autonomous vehicle.

Identification of dynamically appearing and disappearing obstacles in front of the vehicle is one of the major problems for increasing the operating speeds of automated vehicles. The automotive industry is working with autonomous features by delegating part of the decision making to computers, and therefore dynamic map layers have become more important. One suggested solution is to use cloud based IT systems to distribute the data, but these still represent response times on the order of 5-10 minutes in map updates (see Elektrobit. 2015. Map updates for autonomous driving—the sensor cloud approach. Slides of the Automotive World Webinar. 15 Dec. 2015). The challenges may be twofold: 1) How to improve safety by avoiding accidents, and 2) How to minimize the number of false alarms which may result in disturbing the traffic flow.

Examples of these dynamic obstacles are short duration incidences which may for example be animals appearing in front of the vehicle or a pedestrian accidentally falling while crossing the street, which may even result in the pedestrian disappearing from the vehicle's electronic horizon in front of the vehicle. Such events may happen in less than 1 second, and relevant information should be added to the dynamic map layers of all vehicles in the area, but without causing false alarms if the obstacle(s) truly disappears quickly. Otherwise the automatic traffic may become too inefficient, annoying for passengers, and vulnerable to intentional disturbances.

Existing work includes U.S. Pat. No. 8,594,923 B2; U.S. Pat. No. 6,230,098 B1; U.S. Pat. No. 5,614,895 A; EP Patent number 20140157579; US Patent App. No. 20150193988 A1; U.S. Pat. No. 8,467,928 B2; US Patent App. No. US20110169625 A1.

Other resources related to collaborative perception include the Connected Vehicle Reference Implementation Architecture project and the Collaborative Vehicular Perception project at Trinity College Dublin.

SUMMARY

Described herein are systems and methods related to dynamic map layers for autonomous vehicles. The present disclosure relates to making an autonomous vehicle aware of vulnerable road users (such as pedestrians and animals) in front of the vehicle, when these road users are not in range of the vehicle's automotive sensor system(s).

Future autonomous vehicles will need reliable situational awareness information to be updated within a few milliseconds, so as to intervene and take control of the vehicle if necessary. In one sense, this problem is raised by heterogeneous sensing systems in vehicles where one vehicle may have highly advanced LiDAR, radar, and camera systems, whereas non-automated cars may have only a limited number of low cost sensors (e.g., temperature, GPS, and inertia unit for lateral and longitudinal accelerations). Another drawback may be the line-of-sight of visual sensor systems which may often be blocked by other vehicles, or unable to work reliably at night time or in bad weather conditions.

Generally, humans have very good sensing perception, and adaptation capability to various weather conditions. Such information may be very beneficial, especially during a transitional period from manually driven cars to autonomous ones. One problem is how to integrate the sensing capability of a human driver to be utilized in the vehicle (or with other vehicles as well).

If an autonomous vehicle is braking every time the driver or vehicle sensor systems detect potential incidents on the road, the traffic flow will be inefficient and annoying for travelers. Sensor systems which are designed for general object detection purposes and are not optimized for vulnerable road users (e.g., human detection) may cause too many false alarms.

The present disclosure relates to permitting autonomous vehicles to become part of traffic where most vehicles are still traditional manually driven vehicles, and additionally may bring safety benefits for all classes of vehicle while keeping the traffic flow efficient with a minimal amount of false alarms.

The present disclosure focuses on dynamic map layers and allowing real-time (e.g., <1 sec) updates with using all available surrounding sensors (e.g., collaborative sensing) including roadside units and other vehicles. In one embodiment, systems and methods request confirmation from other nearby vehicles if in a specific area a human or animal is causing danger when on-sight-view is limited. In addition, a driver may be kept in the loop by analyzing if the driver is paying attention to a specific area inside of the vehicle. Potential situations may include vulnerable road users (animal, pedestrian, or bicycle, etc.) which are approaching the road from a blind spot (corner, side of the road, etc.).

In some embodiments, real-time updated map data may be utilized in collision avoidance systems. One issue addressed by the present disclosure is to let vehicles be aware of surrounding objects which are behind other vehicles or objects. Similar issues may exist in adverse road conditions and in dark time. This becomes even more challenging when trying to keep traffic flow smooth and avoiding improper accelerations and decelerations.

In an exemplary embodiment, a first vehicle equipped with a first sensor determines that a second vehicle is obstructing a region within a first field of view of the first sensor. In response to this determination, the first vehicle identifies a second sensor of the second vehicle, where the second sensor has a second field of view, and wherein at least a portion of the obstructed region is within the second field of view. The first vehicle requests from the second vehicle a proper subset of information collected from the second sensor, the proper subset of information being information from less than the entire second field of view. The proper subset may include the portion of the obstructed region that is within the second field of view. In some embodiments, the proper subset is limited to the portion of the obstructed region that is within the second field of view. In some embodiments, to identify the second sensor of the second vehicle, the first vehicle sends to the second vehicle a request for information regarding sensor capabilities and receives from the second vehicle information regarding sensors of the second vehicle. The sending of the request may be made in response to the determination that the second vehicle is obstructing the region within the first field of view.

BRIEF DESCRIPTION OF THE DRAWINGS

A more detailed understanding may be had from the following description, presented by way of example in conjunction with the accompanying drawings, wherein.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the disclosure.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

In the future, autonomous vehicles will need reliable situation awareness information which is updated within a few milliseconds to be able to intervene and take over control of the vehicle, if necessary. In one sense, this problem is raised by heterogeneous sensing systems in vehicles which have highly advanced LiDAR, radar, and camera systems, whereas non-automated cars may have only a limited number of relatively low cost sensors (e.g., temperature, GPS, and inertia unit for lateral and longitudinal accelerations, or the like). Further, the line-of-sight of visual sensor systems may often be blocked by other vehicles, and may be less useful at night or in bad weather conditions.

Humans have very good sensing and adaptation capability that works well under various weather conditions. Such perception information may be very beneficial, especially during the transitional period from manually driven cars to autonomous ones. A problem is how to technically integrate the sensing capability of humans to be utilized in the vehicles.

If autonomous vehicles apply the brakes every time the driver or vehicle sensor system detects potential incidents on the road, the traffic flow would be inefficient and especially frustrating for travelers. Sensor systems that are designed for general object detection purposes and are not optimized for vulnerable road users (e.g., human detection, animal detection, etc.) may cause too many false alarms.

In one embodiment of the present disclosure, a database is collected over time in a certain area of interest, recording how the vehicles and drivers are behaving. In one embodiment, data collected may include, but is not limited to, speed, frequency of lane changes, and lateral and longitudinal acceleration, and the like. Such data may be used as a baseline measurement for comparisons of whether there are obvious short term changes in behavior of nearby vehicles, which may be an indication of abnormal traffic conditions (e.g., snow on the road, etc.). The database may be complemented by using the existing ADAS function, like emergency braking or front collision warning signals of the vehicles in a local area and send that data to the other vehicles as indication of the potential safety risks in front.

In some embodiments of the present disclosure, a driver also is present in the vehicle (see FIG. 1), such as when in semi-autonomous driving where the driver is only partly in charge of driving. The driver's attention targets may be highly valuable data points for assessing if an on-the-road or roadside safety related incident exists (e.g., the driver may be staring at one spot in front of the vehicle, or have a sudden facial expression change, or the like).

Figure 1:
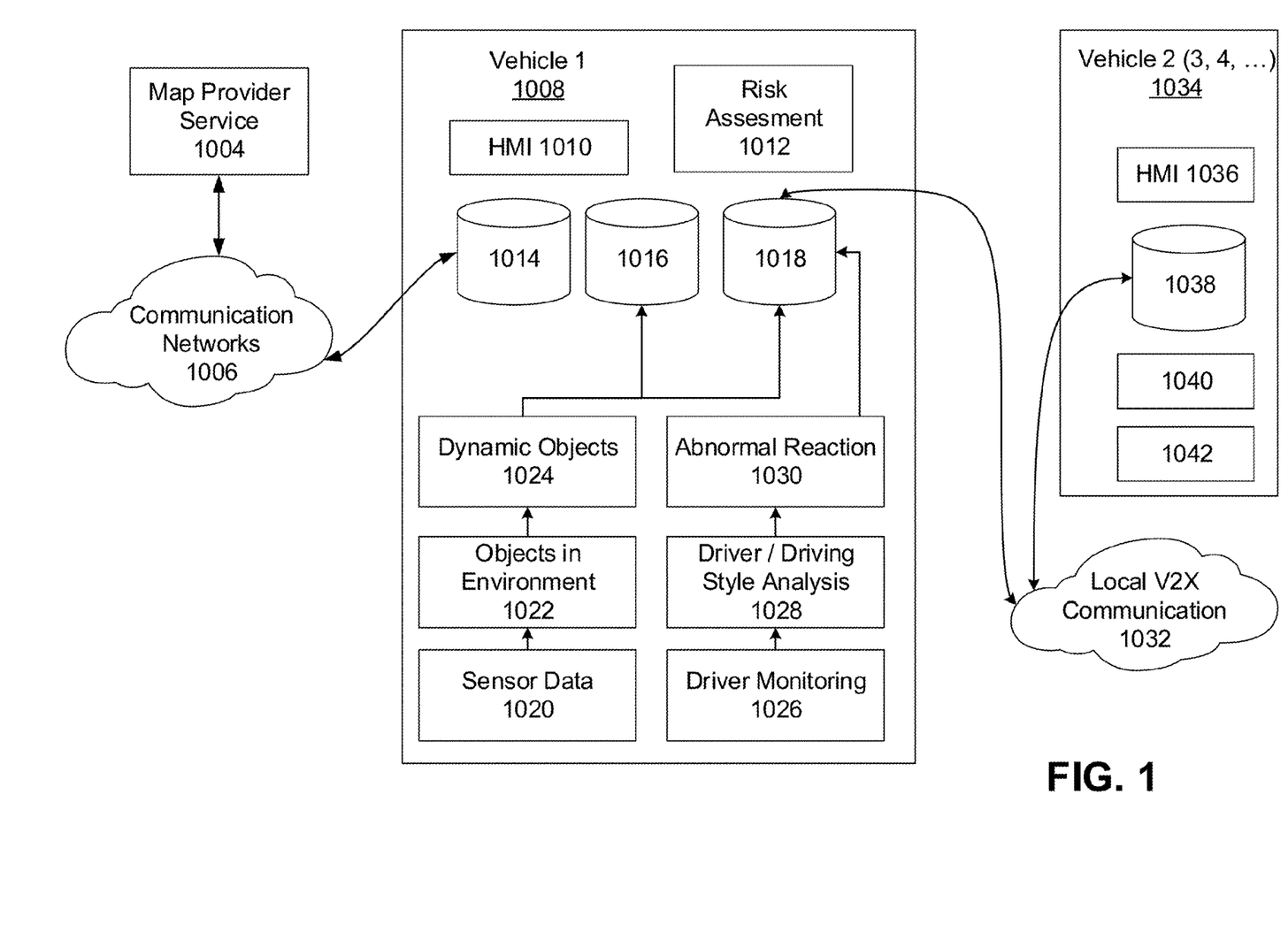
FIG. 1 illustrates an exemplary overall system architecture to exchange the real-time data between vehicles locally for identifying objects appearing in front of the vehicle.

FIG. 1 illustrates an exemplary embodiment of an overall system architecture, in accordance with the present disclosure, to exchange real-time data between vehicles locally for identifying possible safety incidents (e.g., animal on the road, cyclists, etc.). In one embodiment, the software modules may run in the vehicle and map updates may be located in backend servers. In other embodiments, one or more modules may utilize networked services referred to as the "cloud."

A first vehicle 1008 may communicate with a map provider service 1004 via communication networks 1006. First vehicle 1008 may comprise a plurality of modules, including but not limited to a human machine interface (HMI) 1010, and a risk assessment module 1012. First vehicle 1008 may maintain one or more databases and/or map layers, including but not limiting to a static map database 1014, a low frequency update dynamic map layer 1016 (e.g., updated at intervals greater than or equal to 10 minutes, or the like), a high frequency update dynamic map layer 1018 (e.g., updated at intervals less than 100 ms, or the like). In an embodiment, static map database 1014 is updated from the map provider service 1004. In an embodiment, dynamic map layers 1016 and 1018 may be updated based on sensor data 1020. For example, in an embodiment, sensor data 1020 may be used to identify objects in the environment 1022, which may in turn be used to identify dynamic objects 1024. Then dynamic map layers 1016 and 1018 may be updated with the dynamic objects 1024. In some embodiments, the high frequency update dynamic map layer 1018 may be updated based on a driver monitoring module 1026. For example, the driver monitoring module 1026 may perform driver and/or driving style analysis 1028, which may be used to determine an abnormal reaction 1030 of the driver. This abnormal reaction determination 1030 may be used to update dynamic map layer 1018.

In some embodiments, dynamic map layer 1018 may be updated through local communication 1032, such as by V2X communications (e.g., LTE, DSRC, 5G, etc.), with at least a second vehicle 1034 (and/or third vehicle, fourth vehicle, etc.). The second vehicle 1034 (as well as other vehicles) may comprise a HMI 1036, dynamic map layers 1038, an object detection module 1040, and in some cases a driver reaction analysis module 1042.

In one embodiment, all information is packaged in a V2X "local dynamic map" (or LDM) message, which may be broadcast to other nearby vehicles. In one embodiment, nearby vehicles may comprise those approximately 500 m to 1500 m away from the vehicle while still being in IEEE 802.11p WiFi range. This may allow a front vehicle sensor system to be focused on certain areas in front of the vehicle, such as to determine whether an animal is on the road in front of the vehicles. The LDM message may then be processed, and an appropriate intervention action may be activated and a warning message may be presented to the driver. In order to ensure that an observation was correct, the host vehicle may request confirmation from the other vehicles around, such as requesting data related to whether the incident has been detected by one or more of those vehicles. In some embodiments of the present disclosure, only sensor data related to a specific area of interest is communicated between vehicles.

Generally, the data exchange between vehicles (1008, 1034, etc.) and map provider entities (1004) follows the ETSI standards (see, e.g., ETSI. 2014. Intelligent Transport Systems (ITS); Vehicular Communications; Basic Set of Applications; Local Dynamic Maps (LDM). ETSI EN 302 895 v1.1.1. standard). In some embodiments, the process may generally comprise: observing an increased risk that a vulnerable road user (VRU) or other incident is in front of the vehicle, assessing the risk, and fine tuning a risk assessment.

In some embodiments, observing an increasing risk of a VRU ahead may comprise one or more of the following. In one embodiment, the host vehicle sensor system may detect an increasing risk when a VRU (e.g., bicycle, pedestrian) or animal is running front of the vehicle but cannot confirm if the VRU or animal stopped before the road or not. In one embodiment, the host vehicle driver may be looking at a target in front of or to a side of the vehicle, which may indicate an abnormal situation. In one embodiment, one or more other vehicles may observe that a VRU or animal is coming to the road and broadcast an "early warning" message.

In some embodiments, assessing the risk may comprise one or more of the following. In one embodiment, the host vehicle may calculate an exact position of the vehicle and VRU/animal/incident, and estimate the risk and whether braking is needed. In some embodiments, the host vehicle may localize a VRU to the real-time dynamic map layer. In one embodiment, the host vehicle may send a message to other vehicles to confirm if the VRU is approaching the road, and may even ask a vehicle sensor system to focus on a certain location. In one embodiment, the host vehicle may ask a front vehicle driver to confirm if a VRU/animal is approaching from the side of the vehicle and whether the host vehicle driver needs to be alerted.

In some embodiments, fine tuning the risk assessment may comprise one or more of the following. In one embodiment, the vehicle may calculate an appropriate speed when approaching the potential risk by minimizing decelerations. In one embodiment, the host vehicle may inform other vehicles concerning the expected position, speed, and direction of a VRU/animal when sending the real-time dynamic map layers to other vehicles.

Some existing systems have been developed to provide updated information in the dynamic layers of the map data. For example, companies like Google and MobileEye are developing the systems which can bring landmarks and changing bushes to the in-vehicle computing units, but still problems remain when events occur on the less than 1 second time frame of which a vehicle needs to be aware. For example, in hectic traffic when potential danger is caused by pedestrians, animals, and bicycles, or the like, appearing and disappearing within seconds. This may make driving of autonomous or semi-autonomous vehicles frustrating due to frequently adapting the speed even when not needed.

In one embodiment of the present disclosure, the systems and methods keep a driver and a vehicle in an "alerted mode" (e.g., somewhat reducing the speed of the vehicle) until it is ensured that no obstacles exist in front of the vehicle. The driver can also be supported to pay attention to the potential safety risks in front of the vehicle.

In some embodiments, one advantage of the disclosure is that if the incident or VRU (or animal) is on the road or side of the side, other road users may also receive indication of where the potential danger exists. This allows other drivers to also pay attention to the correct location even if the target is not in the view of that vehicle's sensors (see FIGS. 2A-2B). In some embodiments, this disclosure also relates to adaptation of the sensor system to focus on special targets in front of the vehicle or adjusting vehicle dynamic lighting to the right spot for showing potential danger. As shown in FIG. 2B, the proper object detection may enable adaptation and focusing of the vehicle sensor systems and headlamps according to the potential moving object in front of the vehicle.

Figure 2A:
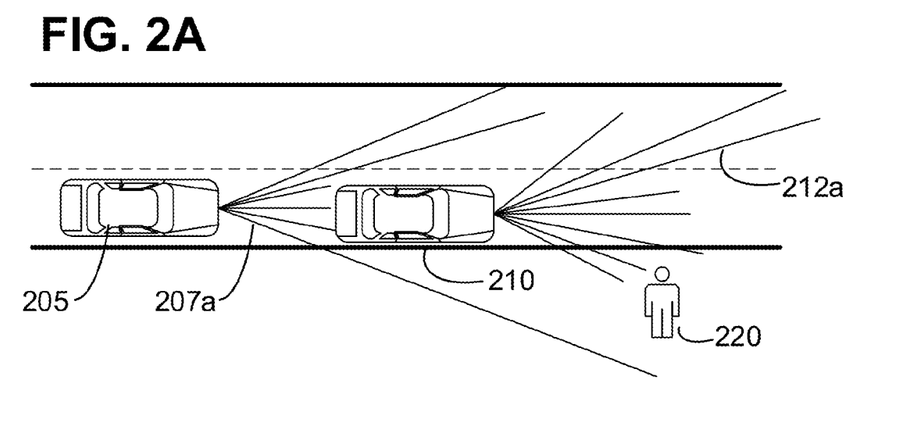
FIG. 2A and FIG. 2B illustrate an exemplary embodiment of the present system and method to adapt an illumination and/or sensor system of one or more vehicles to a detected object.
Figure 2B:
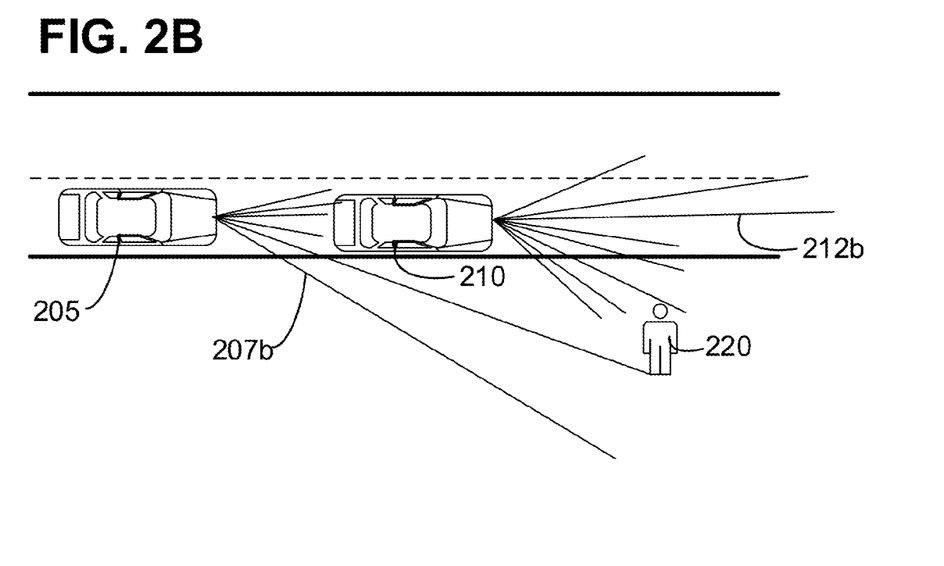

As shown in FIG. 2A, a first vehicle 205 may be traveling on a road, and have its headlamps and/or vehicle sensor systems covering the regions of detection/illumination lines 207a. A second vehicle 210 may be in front of vehicle 205, and have its own detection/illumination lines 212a. As shown in FIG. 2A, a person 220 (or other VRU or object) may be illuminated or detected by second vehicle 210, but not by first vehicle 205. In some embodiments, according to the present disclosure, based on communications between the first vehicle 205 and second vehicle 210, the sensor systems and/or headlamps of one or both vehicles 205 and 210 may be refocused into coverage lines 207b and/or 212b, such that additional detection capability and/or illumination from one or both vehicles may be directed to the location of the person 220 (or other VRU or object).

In one embodiment of the present disclosure, a static map may be used as a background information source. Generally, the source of the static map is not important (e.g., may be from a commercial provider, free maps from the internet, etc.). In one embodiment, the static map is only used for providing a global view (perhaps being like a sensor) concerning the road boundaries and the existing landmarks.

Figure 3:
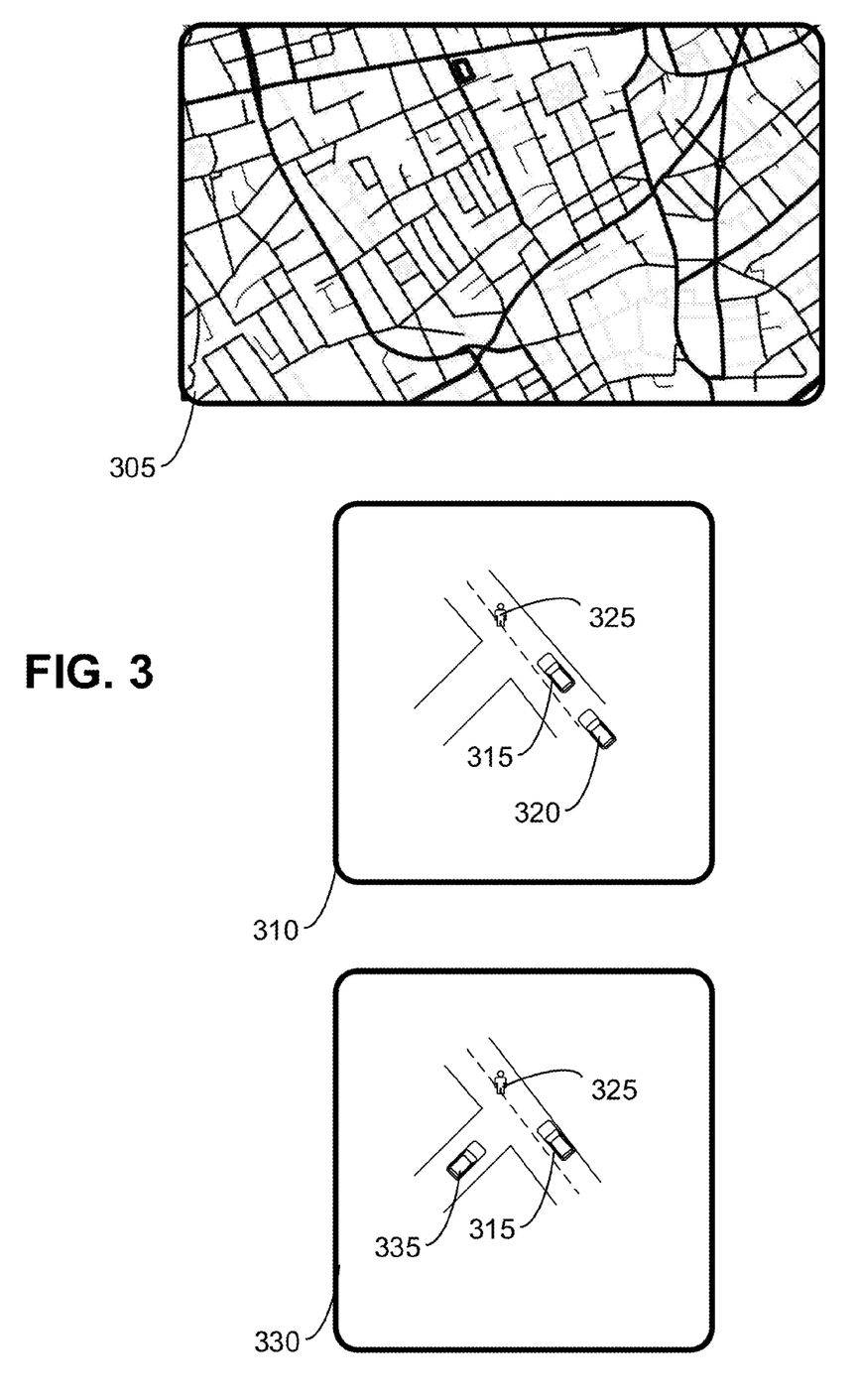
FIG. 3 depicts an exemplary embodiment of map layers being updated in collaboration with other road users.

Generally, the present disclosure relates to dynamic layers of maps and prioritizing various messages according to analysis of a vehicle driver's behavior. FIG. 3 illustrates an exemplary embodiment of the present disclosure wherein the various map layers are updated in collaboration with other road users.

If one of the vehicles or the driver is reacting to an incident ahead of the host vehicle, this may be broadcast to other nearby vehicles. However, confirmation may be requested from other vehicles to check or turn the driver's attention to the certain point in front to confirm whether this is the real danger. As depicted in FIG. 3, in an exemplary situation a static map 305 is downloaded from a remote server to the host vehicle 320. Vehicle 315 may maintain a dynamic map layer 310, and vehicle 335 may maintain a dynamic map layer 330. Vehicles 315 and 335 may each detect a pedestrian 325 walking slowly across the street and then suddenly falling down. Vehicles 315 and 335 may send a warning message to nearby vehicles (here, vehicle 320 and each other), indicating that the respective vehicle is braking. As such, the dynamic maps 310 and 330 (or information related to same) may be received by vehicle 320, and evaluated together with static map 305. In light of the data from these messages, vehicle 320 may update its own dynamic map layer(s), and initiate a smooth deceleration some distance (such as 400 m, or the like) before the intersection, and may return to normal speeds after the pedestrian makes a quick recovery and finishes crossing the road. In some embodiments, the reaction of the driver of vehicle 315 to the pedestrian 325 may be communicated to vehicle 320.

Figure 4:
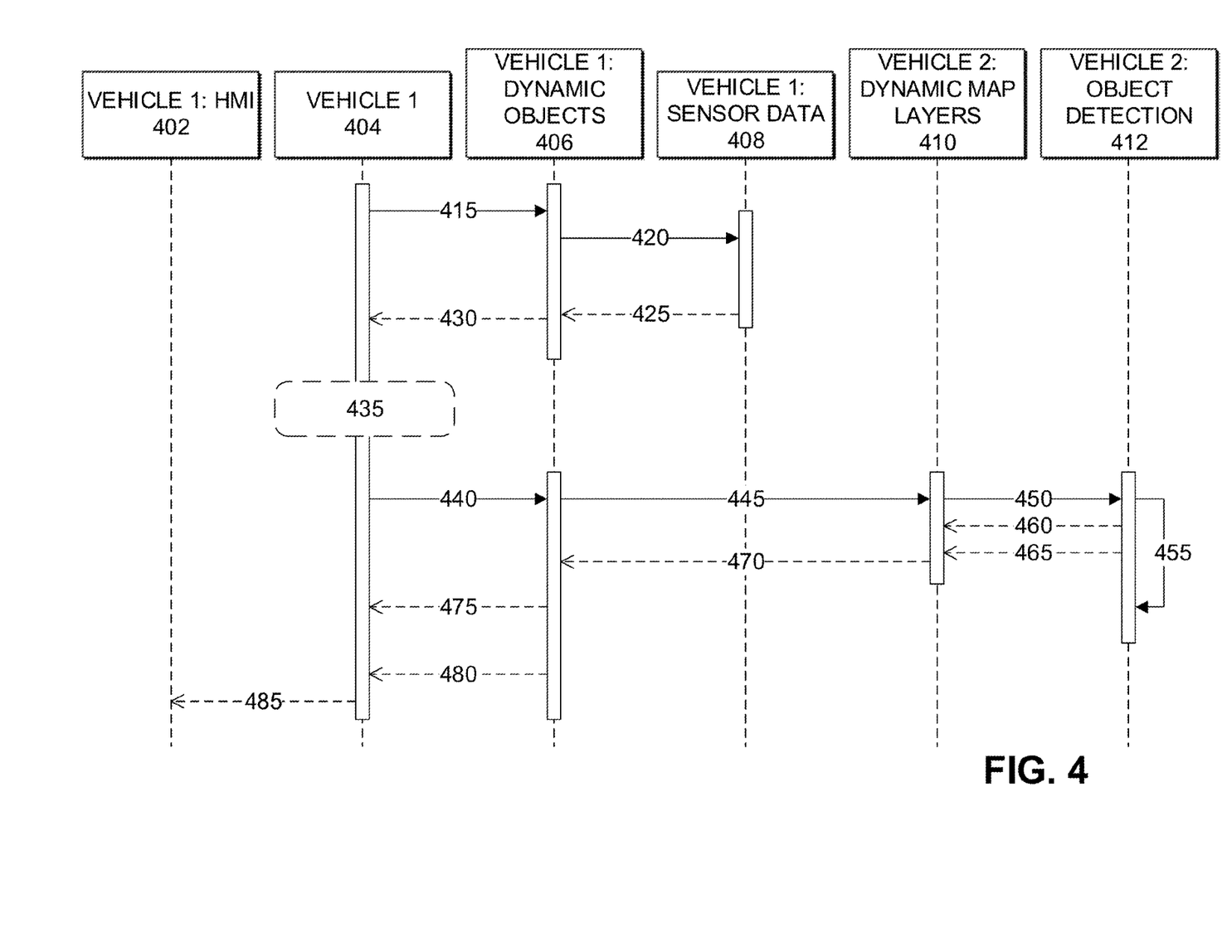
FIG. 4 depicts an exemplary sequence diagram for incident detection and local dynamic map (LDM) update in response to a threshold initiation event.

A sequence diagram illustrating an exemplary embodiment of the real-time LDM update process is shown in FIG. 4. The sequence diagram generally relates to incident detection which may utilize the reactions of other vehicles. In some embodiments, the driver's reactions may also be utilized.

In some embodiments, the sequence may be as follows. A host vehicle 404 (vehicle 1) may perform a dynamic map update (415), requesting sensor data (420) from vehicle 1's sensors 408. The local sensor data (425) may be incorporated into the dynamic objects 406 of vehicle 1, and potential VRU objects (430) determined. In some embodiments, a confidence level for a given object may be below a threshold, and vehicle 1 (404) may request confirmation from one or more other vehicles (435). The data request (440) may include vehicle 1's LDM data (all or a subset) which is communicated to at least a vehicle 2 (445). The request may result in a region of interest data request by vehicle 2 (450) of vehicle 2's sensors and sensor data (e.g., object detection by vehicle 2, 412). In some embodiments, vehicle 2 may process local sensor data in response to the request from vehicle 1. In some embodiments, the processing may further comprise processing a driver attention map 465. In some embodiments, vehicle 2 may broadcast a VRU message (455) based on local object detection 412 steps. Vehicle 2 may update its dynamic map layers 410, and communicate LDM content to vehicle 1 (470) and possibly to other nearby vehicles. The LDM content received from vehicle 2 may be processed by vehicle 1 and incorporated into vehicle 1's dynamic objects and/or dynamic map layers. In some embodiments, an object map may be communicated from vehicle 2 to vehicle 1 (460). In some embodiments, driver state data of the driver of vehicle 1 may be obtained and/or processed (480) to further evaluate dynamic map layers and dynamic objects. In some embodiments, analysis of the relevant combined data may result in a driver warning to the driver of vehicle 1 (485), such as by a human machine interface 402 or other user interface.

Generally, there may be pre-conditions required for there to be process activation. In some embodiments, the driver, vehicle sensor setup, or another vehicle detects a potential object in front of the vehicle. However, the system is not able to recognize if the object is moving in a direction that may lead to a potential collision with the vehicle. In some embodiments, the driver and/or the vehicle sensor system is unable to observe a specific location in front of the vehicle and requires confirmation that there are no accident risks with pedestrians or animals (or the like) ahead.

In one embodiment, a method of the present disclosure may comprise: updating a dynamic map layer; requesting information from other vehicles; (optional) tracking a target of driver attention; activating vehicle control functions; and warning the driver. In other embodiments, some or all of the steps may be present, and other steps may also be incorporated.

In some embodiments, an exemplary process flow may be represented as follows. To update a dynamic map layer, an LDM message may be sent to the environment perception system requesting the system to focus on a certain area in front of the vehicle and to recognize potential VRUs (animals, bicycles or pedestrians, etc.). The host vehicle may request general or specific information from other vehicles, such as by the host vehicle sending information related to potential VRU(s) ahead of the host vehicle and requesting confirmation from the other vehicles if they have also detected the object or potential VRU. In some embodiments, nearby vehicle(s) may map one or more driver attention targets, such as where if the vehicle contains a driver monitoring system, the nearby vehicle may check whether the driver is looking towards a potential target which may indicate the presence of something on or near the road. The host vehicle may also activate vehicle control features, such as starting deceleration or maintaining a speed according to a risk estimation in light of observation data and general or specific data requested and received from nearby vehicles. In some embodiments, the host vehicle may initiate a warning message via the vehicle's user interface (or human machine interface, "HMI") concerning the potential animal, pedestrian, etc. on or near the road.

Figure 5:
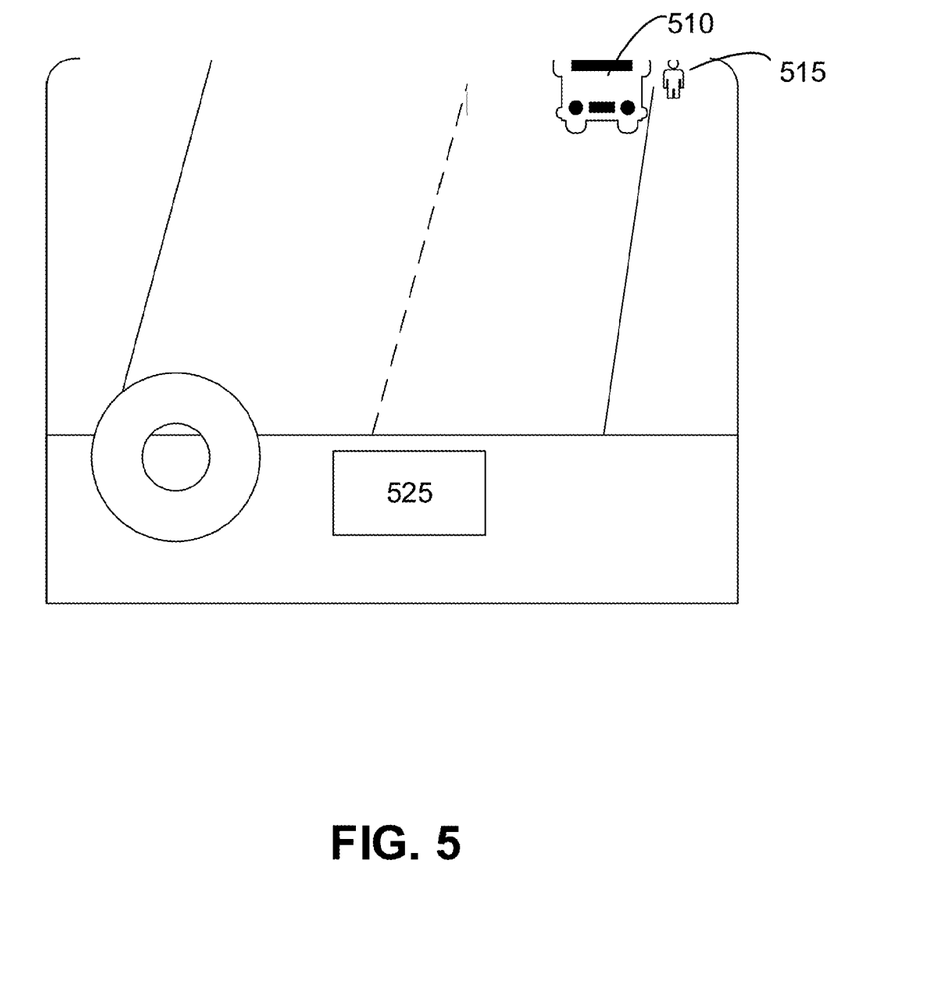
FIG. 5 depicts an example of a warning notification presented to a driver of a host vehicle in response to a confirmation by a vehicle ahead of the host vehicle.

An exemplary embodiment of a warning to a host vehicle driver is illustrated in FIG. 5. FIG. 5 depicts a warning 535 displayed to the driver of the host vehicle after a confirmation request to a nearby vehicle 510 has confirmed the presence of an animal, person, or other VRU 515 ahead. The confirmation by another driver or vehicle 510 may, in some embodiments, serve to reduce false alarms or unnecessary changes in autonomous vehicle behavior that may negatively impact traffic flow. In some embodiments, such confirmation may result from the host vehicle requesting confirmation from other local drivers via the V2X channel whether a VRU exists at a given location, such as the nearby driver providing indication by using an in-vehicle user interface that the driver can see the VRU ahead.

In some embodiments, input is requested from a human driver to confirm an abnormal traffic situation ahead, e.g. the driver may be asked to confirm the potential accident risk with the detected VRU. To avoid annoying messages to drivers, the confirmation may only be requested when the vehicle sensor system is unable identify the potential risk, such as in heavy snow or rain, or due to blocking obstacles. Such embodiments may also assist drivers in being alert and paying attention to potential safety risks while having an autonomous or semi-autonomous driving mode.

Figure 6:
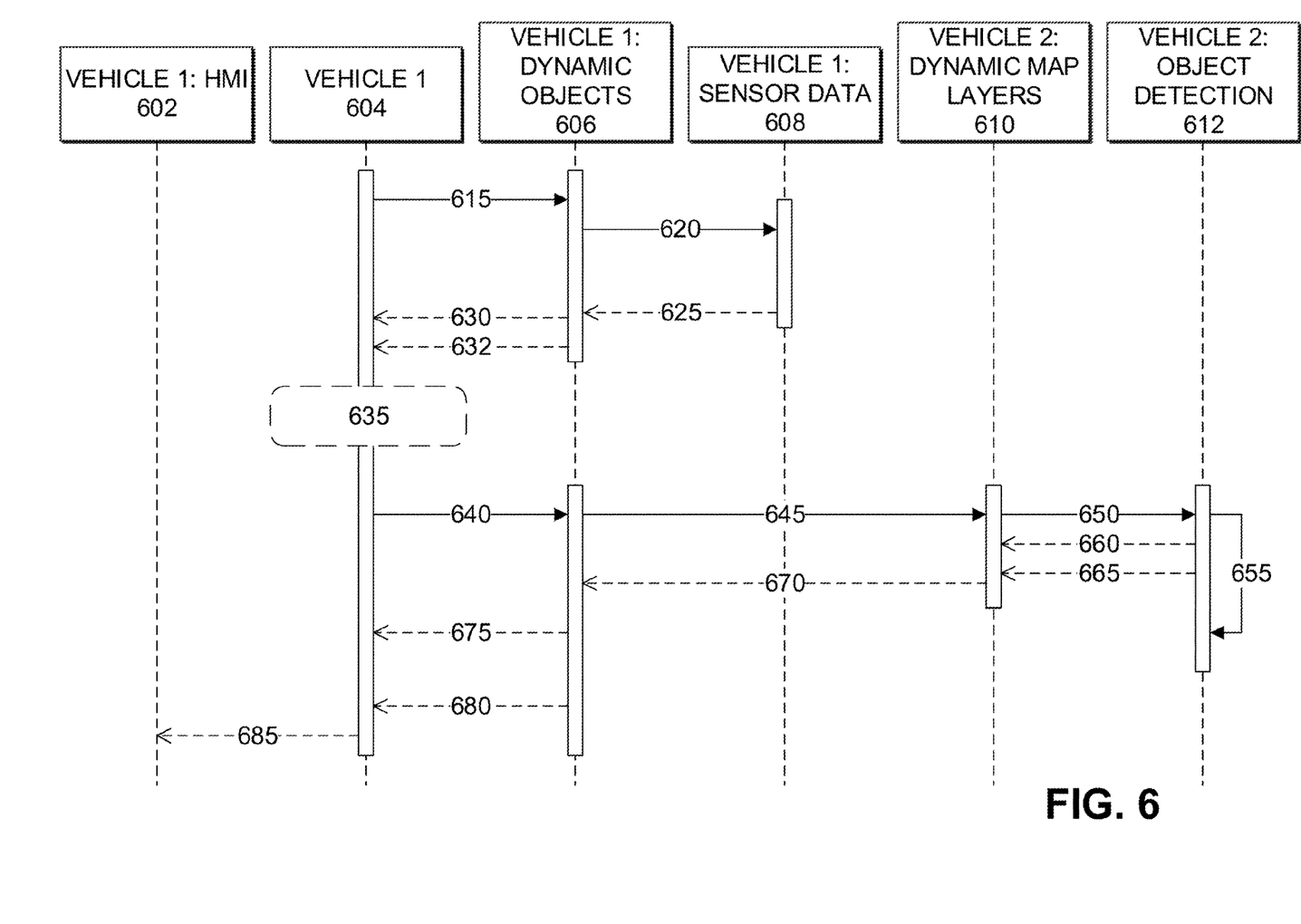
FIG. 6 depicts an exemplary sequence diagram for incident detection and LDM update in response to blind spot detection.

A sequence diagram illustrating an exemplary embodiment of the real-time LDM update process for blind spot detection is shown in FIG. 6. The sequence diagram generally relates to incident detection for detecting objects when some specific sector in front of the host vehicle requires additional information.

In some embodiments, the sequence may be as follows. A host vehicle (vehicle 1) 604 may perform a dynamic map update 615, requesting sensor data 620 from vehicle 1's sensors 608. The local sensor data 625 may be incorporated into the dynamic objects 608 of vehicle 1, and potential VRU objects 630 determined. In addition, a detected area 632 may be recorded (e.g., sector for detections in front of the vehicle). Vehicle 1 may determine that one or more areas are unobserved by vehicle 1's sensors (635), and request additional information 640 from one or more nearby vehicles related to the one or more areas unobserved by vehicle 1's sensors. The data request may include vehicle 1's LDM data (all or a subset) 645, which is communicated to at least a vehicle 2. The request 640 may result in a region of interest data request 650 by vehicle 2 of vehicle 2's sensors and sensor data (e.g., object detection 612 by vehicle 2). In some embodiments, vehicle 2 may process local sensor data 660 in response to the request 645 from vehicle 1. In some embodiments, the processing may further comprise processing a driver attention map 665. In some embodiments, vehicle 2 may broadcast a VRU message 655 based on local object detection steps. Vehicle 2 may update its dynamic map layers 610, and communicate LDM content 670 to vehicle 1, and possibly to other nearby vehicles. The LDM content 670 received from vehicle 2 may be processed by vehicle 1 and incorporated into vehicle 1's dynamic objects 606 and/or dynamic map layers. In some embodiments, an object map 675 may be communicated from vehicle 2 to vehicle 1. In some embodiments, driver state data 680 of the driver of vehicle 1 may be obtained and/or processed to further evaluate dynamic map layers and dynamic objects 606. In some embodiments, analysis of the relevant combined data may result in a driver warning 685 to the driver of vehicle 1, such as by a human machine interface 602, or other user interface.

In an embodiment, a first vehicle (e.g., 604) may be operated based on a first-vehicle-sensor data set. The first vehicle may continuously maintain the first-vehicle-sensor data set. For example, the first-vehicle-sensor data set may be maintained at least in part by determining at the first vehicle that a second vehicle is obstructing at least a portion of a view of a first-vehicle sensor (for example, vehicle 210 blocking part of the view of vehicle 205 in FIG. 2A towards VRU 220). The first vehicle may request a proper subset of sensor data for the obstructed at least portion of the view of the first-vehicle sensor from the second vehicle. The first vehicle may receive the proper subset of sensor data from the second vehicle, and accordingly update the first-vehicle-sensor data set with the received proper subset of sensor data from the second vehicle. In some embodiments, the requested proper subset of sensor data from the second vehicle comprises a subset of a second-vehicle-sensor data set which corresponds to the obstructed at least portion of the view of the first-vehicle sensor. In some cases, maintaining the first-vehicle-sensor data set may further include requesting and receiving a proper subset of sensor data from a third vehicle, or more.

In an embodiment, prior to requesting the proper subset from the second vehicle, the first vehicle may send to the second vehicle a request for information regarding sensor capabilities, and receive from the second vehicle information regarding sensors of the second vehicle. The first vehicle may then determine at least one sensor of the second vehicle corresponding to the obstructed first portion of the view of the first sensor, and the proper subset may include data from the determined at least one sensor of the second vehicle. In some cases, as discussed above in relation to FIGS. 2A-2B, the first vehicle may focus its illumination system (e.g., headlights) in response to the proper subset of sensor data received from the second vehicle.

In various embodiments, sensors of the first vehicle and/or other vehicles may comprise one or more of, without limitation, a stereo camera system, a laser scanning system, a 3D scanner, a radar system, or a LiDAR system.

In some cases, such as where the first vehicle is automated or semi-automated, a vehicle control function of the first vehicle may be activated in response to the received proper subset of sensor data from the second vehicle. Vehicle control functions may include, but are not limited to, decelerating the vehicle; maintaining a speed of the vehicle; changing a lane of the vehicle; and/or the like.

In some embodiments, the driver, vehicle sensor setup, or another vehicle detects a potential object in front of the host vehicle. However, the system is not able to see a specific sector in front of the host vehicle due to obstruction by a vehicle ahead of the host vehicle. In some other embodiments, obstruction may result from the host vehicle being unable to detect objects in a specific sector due to water spray caused by a vehicle ahead, or the like.

In one embodiment, a method of the present disclosure may comprise: updating a dynamic map layer; requesting information from other vehicles; (optional) tracking a target of driver attention; activating vehicle control functions; and warning the driver. In other embodiments, some or all of the steps may be present, and other steps may also be incorporated.

In some embodiments, an exemplary process flow may be represented as follows. To update a dynamic map layer, a dynamic LDM message may be sent to the environment perception system requesting the system to focus on a certain area in front of the vehicle and to recognize potential VRU (animals, bicycles or pedestrians, etc.). The host vehicle may request specific information from other vehicles, such as by the host vehicle requesting confirmation from the obstructing vehicle or other nearby vehicles for the sector which the host vehicle's sensor system is not able to observe. In some embodiments, the nearby vehicle(s) may map one or more driver attention targets, such as where if the vehicle contains a driver monitoring system, the vehicle may check whether the driver is looking towards a potential target which may indicate the presence of something on or near the road. The host vehicle may also activate vehicle control features, such as starting deceleration or maintaining a speed according to a risk estimation in light of observation data and general or specific data requested and received from nearby vehicles. In some embodiments, the host vehicle may initiate a warning message via the vehicle's user interface (or HMI) concerning the potential animal, pedestrian, etc. on or near the road.

Messages.

Generally, in exemplary embodiments, different types of messages may be used, including but not limited to: In-vehicle internal messages which may follow or be based on the Vehicle Sensor Data Cloud Ingestion Interface Specification published by HERE (see HERE. 2015. Vehicle Sensor Data Cloud Ingestion Interface Specification. V2.0.2); Cooperative inter-vehicle information exchange messages which may follow or be based on ETSI specifications and standards (see, e.g., ETSI. 2014. Intelligent Transport Systems (ITS); Vehicular Communications; Basic Set of Applications; Part 3: Specifications of Decentralized Environmental Notification Basic Service. ETSI standard EN 302 637-3 v1.2.1; ETSI. 2014. Intelligent Transport Systems (ITS); Vehicular communications; Basic Set of Applications; Part 2: Specification of Cooperative Awareness Basic Service. ETSI standard EN 302 637-2. v1.3.1; and ETSI 2006. Intelligent Transport Systems (ITS); Vehicular Communications; Basic Set of Applications; Local Dynamic Map (LDM); Rationale for and guidance on standardization. ETSI Technical Report 102 863. V1.1.1); and Driver monitoring and human interaction messages which do not necessarily follow the existing standards.

In some embodiments, one class of message may comprise VRU Objects, where information is exchanged between the in-vehicle computer unit and local-dynamic maps database. Exemplary data in this class of message may comprise ObjectDetection (general details available in the HERE specification). Sub-elements of ObjectDetection may include, but are not limited to: timestamp (e.g., time stamp in UTC time); detectedObjectID (e.g., ID given for the detected object, such as animal, pedestrian, bicycle, etc.); positionOffset (Location of the object in relation to the host vehicle); objectType (Type of living object, such as MOVING PERSON, MOVING ANIMAL; note that MOVING ANIMAL is not a feature of the HERE specification and is introduced in the present disclosure); and/or the like.

In some embodiments, one class of message may comprise DetectedArea, related to the following sector in front of the vehicle (details available in HERE specification). In some embodiments, the elements of DetectedArea may comprise those needed to draw the detection range in front of the vehicle around 180 degrees, such as, but not limited to: SensorOffset (The position offset of the vehicle's sensor to the vehicle's reference point, e.g., center of the vehicle); Sensor Direction (a vector defining the direction of the sensor view in relation to the vehicle); and/or the like.

In some embodiments, one class of message may comprise LDMPackageRequest, which may be partly based on the existing ETSI standards. In some embodiments, new fields may be incorporated, including but not limited to: MapDataSector (the objects detected in the specific area); CaptureRawData (Boolean whether the raw data is capture or not); and/or the like. Elements of the MapDataSector may comprise, but not be limited to: Vehicle position (e.g., position of the vehicle in WGS84 coordinates); LeftBorderDirection (Direction of left border in the captured area); RightBorderDirection (Direction of right border in the captured area); DetectionRange (Distance to the detection range in front); and/or the like.

In some embodiments, one class of message may comprise LDMContent, with message content details generally available in ETSI standardization guidance). Elements may include, but not be limited to: Co-operative forward collision warning (potential collision observe by front vehicle); Emergency electronic brake lights (emergency braking activated); MapDataSector (the objects detected in the specific area); Hazard information (information content concerning hazardous objects in front); RawSensorData (raw data from the sensors); DriverAttentionTarget (WGS84 coordinates concerning driver attention target); (optional) DriverEmotion (State estimation of the driver); and/or the like.

In some embodiments, Hazard information may comprise, but not be limited to: Traffic accident (traffic accident report in front); Road is not passable (obstacle on a road); Animals on road (animal in front of the vehicle); People on road (humans in front of the vehicle); Slow moving vehicles (slowly moving in front).

In some embodiments, elements of the MapDataSector may comprise, but not be limited to: Vehicle position (e.g., position of the vehicle in WGS84 coordinates); LeftBorderDirection (Direction of left border in the captured area); RightBorderDirection (Direction of right border in the captured area); DetectionRange (Distance to the detection range in front); and/or the like.

In some embodiments, RawSensorData may comprise, but not be limited to: SignalVectorNumber (Number of radars, LiDARs in the vehicle); List of SignalVectors (Vectors of radar or LiDAR signal in captured front sector); MatrixDataNumber (Number of cameras in the captured sector); List of MatrixData (Matrices of camera data in the captured sector); and/or the like.

In some embodiments, DriverEmotion may comprise, but not be limited to, state estimations of the driver such as: Scared (Driver appears scared or startled); Smiling (Smiling faces); Normal (Baseline to which the face recognition has been calibrated); and/or the like.

DataRequest messages may comprise various elements as will be apparent to those skilled in the art in view of the present disclosure.

In some embodiments, one class of message may comprise ROIdataRequest, with elements related to asking for the dynamic object content in a specific area. One exemplary element may comprise LocationCoordinates (e.g., WGS84 coordinates of region of interests), which may further include sub-elements including but not limited to: TopLeftCorner (top left corner of region of interests); Width; Height; and/or the like.

In some embodiments, one class of message may comprise ObjectMap, related to a list of objects detected by a Vehicle 2 (or other non-host vehicle). One exemplary element may comprise ObjectDetection (general details available in HERE specification). Sub-elements of ObjectDetection may include, but are not limited to: timestamp (e.g., time stamp in UTC time); detectedObjectID (e.g., ID given for the detected object, such as animal, pedestrian, bicycle, etc.); positionOffset (Location of the object in relation to the host vehicle); objectType (Type of living object, such as MOVING PERSON, MOVING ANIMAL.)

In some embodiments, one class of message may comprise DriverStateData, which is not available in current standards. One exemplary element may comprise DriverState. Sub-elements of DriverState may include, but are not limited to: DriverAttentionMap (WGS84 coordinates to where the driver is paying attention); DriverReaction (e.g., change in the driver's emotions, such as from smiling to scared or startled, distracted, agitated, etc.; may comprise a true or false value); DriverEmotions (e.g., scared/startled, nervous, agitated, or normal, etc.); and/or the like.

In some embodiments, one class of message may comprise DriverWarning, which is not directly available in existing standards. One exemplary element may comprise Hazard information, having information content concerning potential living objects ahead of the vehicle. Sub-elements of Hazard information may include, but are not limited to: Animals on road (animal in front of the vehicle); People on road (humans in front of the vehicle); and/or the like.

In various embodiments, the concepts of the present disclosure may be adapted alternative scenarios. In one embodiment, the disclosed systems and methods may be utilized for other types of object checking around the vehicle, for objects which a driver or sensor setup of the vehicle cannot see. In one embodiment, the disclosed systems and methods may be used to send a host vehicle's own data to another vehicle for processing, such as if the other vehicle may have better capability (e.g., more processing power, better sensors, etc.) to detect objects ahead.

In some embodiments, the present disclosure relates to detection of humans, animals, and pedestrians on a road. In some embodiments, for detection the minimal dimensions are at least 1 m height and 30 cm width for a moving object. However, in some embodiments, systems with better environment perception systems may be incorporated for other corresponding moving objects (e.g., small pets, fallen trees, etc.), which may have other dimensions.

Use Case Exemplary Situation.

In an exemplary real world use case, Bob is driving his car which is equipped with the new highway assistance system. The system controls speed and has automatic passing on motorways when needed. Bob is driving at night, so it is dark, and additionally there is rainy weather. A large truck is blocking the front view of Bob's vehicle, and Bob is making a phone call to his wife to check their shopping list before going to the store.

Suddenly, a deer approaches the motorway but the truck driver is checking addresses on a cargo list. Bob sees some movement in his periphery view, and also his vehicle's sensors detect abnormal objects. But the vehicle system is unable determine if the abnormal objects are bushes or an animal. The host vehicle system automatically requests confirmation from the truck whether the truck's sensor system is able to see movement by focusing observations to a certain distance in front of the truck. However, due to the rain the truck sensor system also fails and sends a "normal" message back to Bob's vehicle. Then Bob's vehicle again requests confirmation from the truck driver that nothing is there. In response, the truck prompts the truck driver to look more precisely at the location ahead, and the driver reacts that everything is normal (e.g., since the deer has already passed to other side of the road). Accordingly, this confirmation is passed to Bob's vehicle and no reaction is needed from Bob's highway assistance system.

Additional Embodiments

In an embodiment, there is a method for augmenting sensor capabilities of a first vehicle, comprising: responsive to a determination at a first vehicle that a second vehicle is obstructing a determined first portion of the view of a first sensor of a first modality: sending to the second vehicle a request for information regarding sensor capabilities; receiving from the second vehicle information regarding sensors of the second vehicle; determining at least one sensor of the second vehicle corresponding to the obstructed first portion of the view of the first sensor; sending to the second vehicle a request for a proper subset of information derived from the determined sensor of the second vehicle; and receiving, from the second vehicle, a proper subset of information derived from the determined sensor corresponding to the obstructed first portion. The method may comprise wherein a modality of the at least one sensor of the second vehicle is different than the first modality of the first sensor of the first vehicle. The method may further comprise focusing an illumination system of the first vehicle in response to the information received from the second vehicle. The method may comprise wherein the first vehicle comprises an autonomous or semi-autonomous vehicle. The method may comprise wherein the first sensor comprises a stereo camera system, a laser scanning system, a 3D scanner, a radar system, or a LiDAR system. The method may comprise wherein the at least one sensor of the second vehicle comprises at least one of a stereo camera system, a laser scanning system, a 3D scanner, or a LiDAR system. The method may further comprise requesting from a third vehicle information corresponding to the determined obstructed first portion of the view of the first sensor of the first modality of the first vehicle; and receiving, from the third vehicle, a proper subset of information corresponding to the determined obstructed portion of the view of the first sensor of the first modality of the first vehicle. The method may further comprise outputting at least a first representation of the proper subset of information to a user of the first vehicle by a user interface. The method may further comprise generating an attention map with a driver monitoring system for a driver of the second vehicle in response to the request for the proper subset of information, and communicating the attention map to the first vehicle. The method may further comprise activating a vehicle control function of the first vehicle. The method may comprise wherein the vehicle control function comprises at least one of: decelerating the vehicle; maintaining a speed of the vehicle; changing a lane of the vehicle. The method may further comprise displaying a warning message to a user of the first vehicle in response to analysis of the received subset of information. The method may comprise wherein displaying the warning message further comprises displaying the warning message through a user interface of the first vehicle. The method may comprise wherein the user interface comprises a wireless receive/transmit unit. The method may comprise wherein the first and second vehicle communicate by a V2X communication. The method may comprise wherein the first and second vehicle communicate by a V2V communication.

In an embodiment, there is a method for augmenting sensor capabilities of a first vehicle, comprising: determining at a first vehicle that a second vehicle is obstructing a determined first portion of the view of a first sensor of a first modality; sending to the second vehicle a request for information regarding sensor capabilities of the second vehicle; receiving from the second vehicle information regarding sensors of the second vehicle; determining at least one sensor of the second vehicle corresponding to the determined obstructed first portion of the view of the first sensor of the first modality of the first vehicle; sending to the second vehicle a request for a subset of information derived from the determined at least one sensor of the second vehicle corresponding to the determined obstructed first portion of the view of the first sensor of the first modality of the first vehicle; and receiving, from the second vehicle, a subset of information derived from the determined at least one sensor corresponding to the determined obstructed portion of the view of the first sensor of the first modality of the first vehicle.

In an embodiment, there is a method for augmenting sensor capabilities of a first vehicle, comprising: determining at a first vehicle that a determined first portion of the view of a first sensor of a first modality is obstructed; sending to a second vehicle a request for information regarding sensor capabilities; receiving from the second vehicle information regarding sensors of the second vehicle; determining at least one sensor of the second vehicle corresponding to the determined obstructed first portion of the view of the first sensor of the first modality of the first vehicle; sending to the second vehicle a request for a subset of information derived from the determined at least one sensor of the second vehicle corresponding to the determined obstructed first portion of the view of the first sensor of the first modality of the first vehicle; and receiving, from the second vehicle, a subset of information derived from the determined at least one sensor corresponding to the determined obstructed portion of the view of the first sensor of the first modality of the first vehicle.

In an embodiment, there is a method for augmenting sensor capabilities of a first vehicle, comprising: determining at a first vehicle that a determined first portion of the view of a first sensor of a first modality is obstructed; sending to a remote sensor system a request for information regarding sensor capabilities; receiving from the remote sensor system information regarding sensors of the remote sensor system; determining at least one sensor of the remote sensor system corresponding to the determined obstructed first portion of the view of the first sensor of the first modality of the first vehicle; sending to the remote sensor system a request for a subset of information derived from the determined at least one sensor of the remote sensor system corresponding to the determined obstructed first portion of the view of the first sensor of the first modality of the first vehicle; and receiving, from the remote sensor system, a subset of information derived from the determined at least one sensor corresponding to the determined obstructed portion of the view of the first sensor of the first modality of the first vehicle. The method may comprise wherein the remote sensor system comprises a roadside sensor unit.

In an embodiment, there is a method comprising: determining at a first vehicle that a portion of a view of a first sensor of the first vehicle is obstructed; requesting from at least a second vehicle a subset of sensor data of at least one sensor of the second vehicle corresponding to the obstructed portion of the view of the first sensor of the first vehicle; and receiving at the first vehicle from the at least second vehicle the subset of sensor data. The method may comprise wherein the second vehicle is obstructing the portion of the view of the first sensor of the first vehicle.

In an embodiment, there is a method for augmenting sensor capabilities of a first vehicle, comprising: responsive to a determination at a first vehicle that a determined first portion of the view of a first sensor of a first modality of the first vehicle is obstructed: sending to at least a second vehicle a request for information regarding sensor capabilities; receiving from at least the second vehicle information regarding sensors of at least the second vehicle; determining at least one sensor of at least the second vehicle corresponding to the determined obstructed first portion of the view of the first sensor of the first modality of the first vehicle; sending to at least the second vehicle a request for a proper subset of information derived from the determined at least one sensor of the second vehicle corresponding to the determined obstructed first portion of the view of the first sensor of the first modality of the first vehicle; and receiving, from at least the second vehicle, the proper subset of information derived from the determined at least one sensor corresponding to the determined obstructed portion of the view of the first sensor of the first modality of the first vehicle.

In an embodiment, there is a system comprising a processor and a non-transitory storage medium, the storage medium storing instructions operative to perform functions comprising: responsive to a determination at a first vehicle that a second vehicle is obstructing a determined first portion of the view of a first sensor of a first modality: sending to the second vehicle a request for information regarding sensor capabilities; receiving from the second vehicle information regarding sensors of the second vehicle; determining at least one sensor of the second vehicle corresponding to the determined obstructed first portion of the view of the first sensor of the first modality of the first vehicle; sending to the second vehicle a request for a proper subset of information derived from the determined at least one sensor of the second vehicle corresponding to the determined obstructed first portion of the view of the first sensor of the first modality of the first vehicle; and receiving, from the second vehicle, a proper subset of information derived from the determined at least one sensor corresponding to the determined obstructed portion of the view of the first sensor of the first modality of the first vehicle.

In an embodiment, there is a system comprising a processor and a non-transitory storage medium, the storage medium storing instructions operative to perform functions comprising: determining at a first vehicle that a determined first portion of the view of a first sensor of a first modality is obstructed; sending to a second vehicle a request for information regarding sensor capabilities; receiving from the second vehicle information regarding sensors of the second vehicle; determining an at least one sensor of the second vehicle corresponding to the determined obstructed first portion of the view of the first sensor of the first modality of the first vehicle; sending to the second vehicle a request for a proper subset of information derived from the determined at least one sensor of the second vehicle corresponding to the determined obstructed first portion of the view of the first sensor of the first modality of the first vehicle; and receiving, from the second vehicle, a proper subset of information derived from the determined at least one sensor corresponding to the determined obstructed portion of the view of the first sensor of the first modality of the first vehicle.

In an embodiment, there is a system comprising a processor and a non-transitory storage medium, the storage medium storing instructions operative to perform functions comprising: determining at a first vehicle that a determined first portion of the view of a first sensor of a first modality is obstructed; sending to a remote sensor system a request for information regarding sensor capabilities; receiving from the remote sensor system information regarding sensors of the remote sensor system; determining an at least one sensor of the remote sensor system corresponding to the determined obstructed first portion of the view of the first sensor of the first modality of the first vehicle; sending to the remote sensor system a request for a subset of information derived from the determined at least one sensor of the remote sensor system corresponding to the determined obstructed first portion of the view of the first sensor of the first modality of the first vehicle; and receiving, from the remote sensor system, a subset of information derived from the determined at least one sensor corresponding to the determined obstructed portion of the view of the first sensor of the first modality of the first vehicle.

In an embodiment, there is a system comprising a processor and a non-transitory storage medium, the storage medium storing instructions operative to perform functions comprising: determining at a first vehicle that a portion of a view of a first sensor of the first vehicle is obstructed; requesting from at least a second vehicle a subset of sensor data of at least one sensor of the second vehicle corresponding to the obstructed portion of the view of the first sensor of the first vehicle; and receiving at the first vehicle from the at least second vehicle the subset of sensor data.

Exemplary embodiments disclosed herein are implemented using one or more wired and/or wireless network nodes, such as a wireless transmit/receive unit (WTRU) or other network entity.

Figure 7:
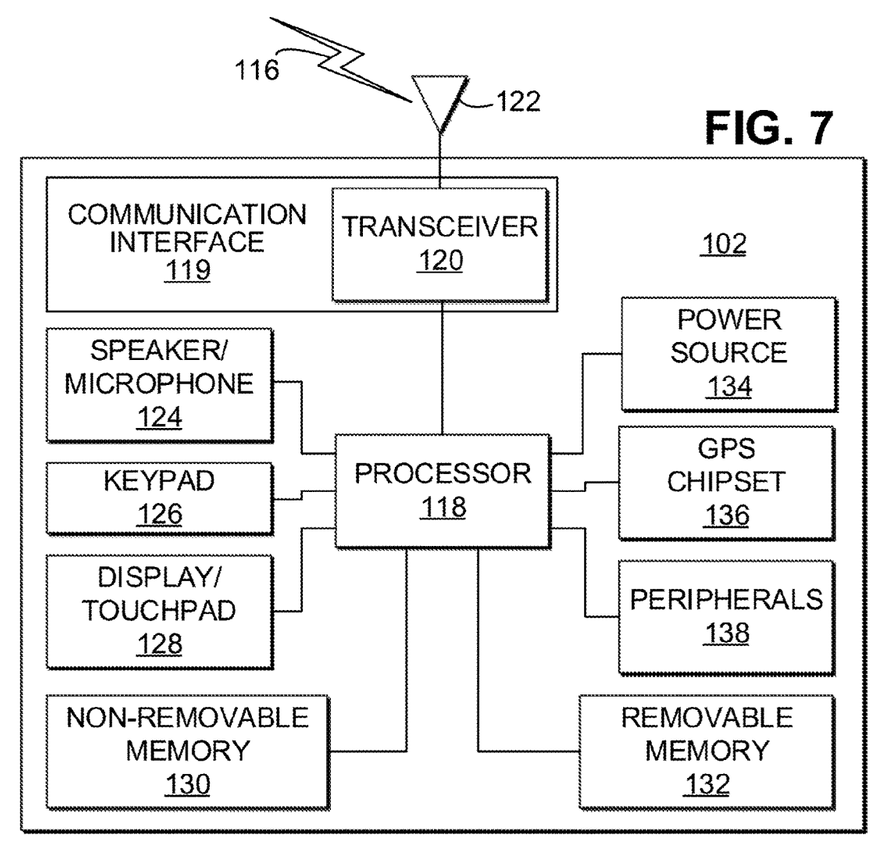
FIG. 7 illustrates an exemplary wireless transmit/receive unit (WTRU) that may be employed as a component of a vehicle in some embodiments.

FIG. 7 is a system diagram of an exemplary WTRU 102, which may be employed as a component of the vehicle system in embodiments described herein. As shown in FIG. 6, the WTRU 102 may include a processor 118, a communication interface 119 including a transceiver 120, a transmit/receive element 122, a speaker/microphone 124, a keypad 126, a display/touchpad 128, a non-removable memory 130, a removable memory 132, a power source 134, a global positioning system (GPS) chipset 136, and sensors 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 7 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8:
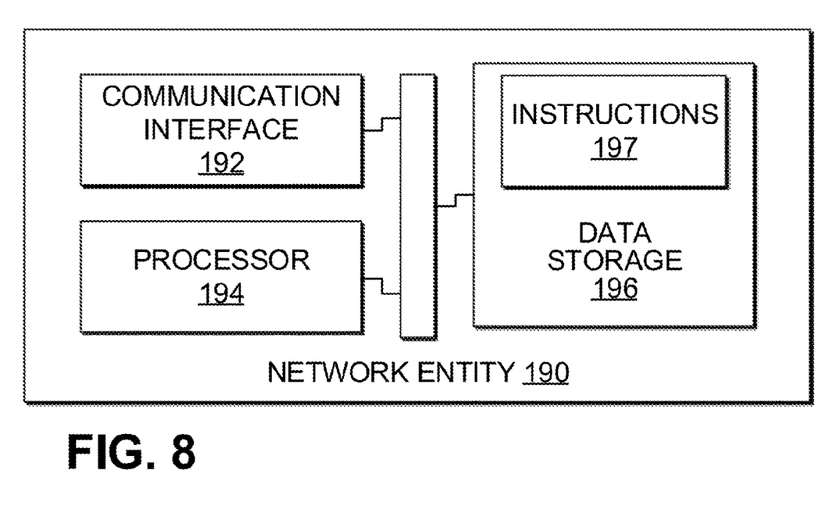
FIG. 8 illustrates an exemplary network entity that may be employed in some embodiments.

FIG. 8 depicts an exemplary network entity 190 that may be used in embodiments of the present disclosure. As depicted in FIG. 8, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 7, data storage 196 contains program instructions 197 executable by processor 194 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
    operating a first vehicle based on a first-vehicle-sensor data set; and
    maintaining the first-vehicle-sensor data set at least in part by:
        determining at the first vehicle that a second vehicle is obstructing at least a portion of a view of a first-vehicle sensor;
        requesting a proper subset of sensor data for the obstructed at least portion of the view of the first-vehicle sensor from the second vehicle;
        receiving the proper subset of sensor data from the second vehicle; and
        accordingly updating the first-vehicle-sensor data set with the received proper subset of sensor data from the second vehicle.

2. The method of claim 1, wherein the requested proper subset of sensor data from the second vehicle comprises a subset of a second-vehicle-sensor data set which corresponds to the obstructed at least portion of the view of the first-vehicle sensor.

3. The method of claim 1, further comprising:
    sending to the second vehicle a request for information regarding sensor capabilities;
    receiving from the second vehicle information regarding sensors of the second vehicle; and
    determining at least one sensor of the second vehicle corresponding to the obstructed first portion of the view of the first sensor.

4. The method of claim 1, further comprising focusing an illumination system of the first vehicle in response to the proper subset of sensor data received from the second vehicle.

5. The method of claim 1, further comprising activating a vehicle control function of the first vehicle.

6. The method of claim 5, wherein the vehicle control function comprises at least one of: decelerating the vehicle; maintaining a speed of the vehicle; changing a lane of the vehicle.

7. The method of claim 1, wherein maintaining the first-vehicle-sensor data set further comprises:
    requesting a proper subset of sensor data for the obstructed at least portion of the view of the first-vehicle sensor from a third vehicle;
    receiving the proper subset of sensor data from the third vehicle; and
    accordingly updating the first-vehicle-sensor data set with the received proper subset of sensor data from the third vehicle.

8. The method of claim 1, further comprising outputting at least a first representation of the proper subset of sensor data for the obstructed at least portion of the view of the first-vehicle sensor to a user of the first vehicle by a user interface.

9. The method of claim 1, further comprising:
    detecting a potential safety risk using the proper subset of sensor data received from the second vehicle;
    determining if a road user is approaching the first vehicle; and
    responsive to determining that the road user is approaching the first vehicle, displaying a warning related to the potential safety risk.

10. The method of claim 9, further comprising receiving a proper subset of sensor data from a third vehicle, wherein detecting the potential safety risk additionally uses the proper subset of sensor data received from the third vehicle.

11. The method of claim 1, further comprising:
    retrieving sensor data measuring a driver reaction for a driver of the first vehicle;
    generating a driving style for the driver of the first vehicle; and
    responsive to detecting that the retrieved sensor data indicates an abnormal reaction based on the driving style for the driver of the first vehicle, displaying a warning related to the abnormal reaction.

12. The method of claim 1, further comprising:
    retrieving, from the second vehicle, information indicating one or more sensors of the second vehicle; and determining at least one determined sensor of the one or more sensors of the second vehicle corresponds to the obstructed at least portion of the view of the first vehicle sensor.

13. The method of claim 12, further comprising requesting one of the one or more sensors of the second vehicle be focused to detect a potential object in a view of the sensor of the second vehicle.

14. The method of claim 12, wherein requesting the proper subset of sensor data comprises comparing a capability of the first-vehicle sensor with a capability of one of the one or more sensors of the second vehicle.

15. A system comprising a processor and a non-transitory storage medium, the storage medium storing instructions operative, when executed by the processor, to cause the system to perform functions comprising:
    operating a first vehicle based on a first-vehicle-sensor data set; and
    maintaining the first-vehicle-sensor data set at least in part by:
    determining at the first vehicle that a second vehicle is obstructing at least a portion of a view of a first-vehicle sensor;
    requesting a proper subset of sensor data for the obstructed at least portion of the view of the first-vehicle sensor from the second vehicle;
    receiving the proper subset of sensor data from the second vehicle; and
    accordingly updating the first-vehicle-sensor data set with the received proper subset of sensor data from the second vehicle.

16. The system of claim 15, wherein the non-transitory storage medium further stores instructions operative, when executed by the processor, to cause the system to perform functions comprising:
    sending to the second vehicle a request for information regarding sensor capabilities;
    receiving from the second vehicle information regarding sensors of the second vehicle; and
    determining at least one sensor of the second vehicle corresponding to the obstructed first portion of the view of the first sensor.

17. The system of claim 15, wherein the non-transitory storage medium further stores instructions operative, when executed by the processor, to cause the system to perform functions comprising:
    requesting a proper subset of sensor data for the obstructed at least portion of the view of the first-vehicle sensor from a third vehicle;
    receiving the proper subset of sensor data from the third vehicle; and
    accordingly updating the first-vehicle-sensor data set with the received proper subset of sensor data from the third vehicle.

18. The system of claim 15, wherein the non-transitory storage medium further stores instructions operative, when executed by the processor, to cause the system to perform functions comprising:
    detecting a potential safety risk using the proper subset of sensor data received from the second vehicle;
    determining if a road user is approaching the first vehicle; and
    responsive to determining that the road user is approaching the first vehicle, displaying a warning related to the potential safety risk.

19. The system of claim 18, wherein the non-transitory storage medium further stores instructions operative, when executed by the processor, to cause the system to perform functions comprising receiving a proper subset of sensor data from a third vehicle, wherein detecting the potential safety risk additionally uses the proper subset of sensor data received from the third vehicle.

20. The system of claim 15, wherein the non-transitory storage medium further stores instructions operative, when executed by the processor, to cause the system to perform functions comprising:
    retrieving sensor data measuring a driver reaction for a driver of the first vehicle;
    generating a driving style for the driver of the first vehicle; and
    responsive to detecting that the retrieved sensor data indicates an abnormal reaction based on the driving style for the driver of the first vehicle, displaying a warning related to the abnormal reaction.

* * * * *